Patented Aug. 26, 1941

2,253,828

UNITED STATES PATENT OFFICE 2,253,828

EASILY WATER SOLUBLE SALTS OF WOOL DYESTUFFS

Samuel von Allmen and Edmond Rosselet, Basel, Switzerland, assignors to Sandoz Ltd., Basel, Switzerland No Drawing. Application April 21, 1939, Serial No. 269,260. In Switzerland April 29, 1938

4 Claims. (Cl. 260—374)

The present invention relates to the production of easily water soluble salts of acid wool dyestuffs that contain an anthraquinone nucleus.

It is well known that among the sulphonated dyestuffs derived from the anthraquinone, some of them possess an insufficient solubility in water and present therefore various difficulties, when they are used in the dyeing and printing.

It has now been found that the solubility of such dyestuffs can be greatly increased by transforming them into lithium salts, which, as it has been ascertained, possess a much better solubility in water than the sodium salts generally used for this purpose.

The dyestuffs which are especially suitable for carrying out the present invention respond to the following general formula

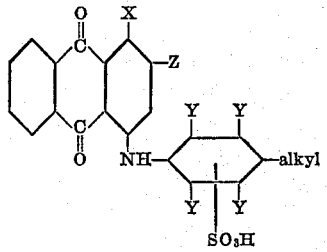

wherein X stands for a hydroxy, amino, alkylamino and sulphonated arylamino group, Y stands for hydrogen and alkyl and Z stands for hydrogen and halogen.

Also the dyestuffs possessing the following general formula

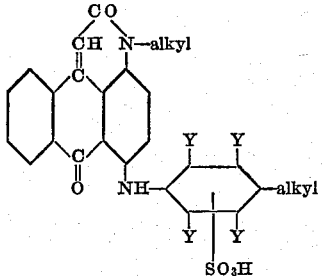

wherein Y stands for hydrogen and alkyl, become more easily soluble in water when they are transformed into lithium salts.

The preparation of the lithium salts of the sulphonated wool dyestuffs of the above constitution can be carried out by treating the free dyestuff acids with lithium hydroxide, chloride, sulphate, carbonate and the like in presence of water, or by double decomposition of suitable dyestuff salts, for example by treating the calcium or barium salts of the dyestuffs with lithium carbonate or sulphate.

The easily water-soluble lithium salts are then obtained in dry state by evaporation of the solution or in any other usual way.

The following table shows the difference in the solubility of the new salts as compared to the corresponding sodium salts usually employed.

| Dyestuff | 1,000 parts of boiling water dissolve— | |
|---|---|---|
| | Sodium salt | Lithium salt |
| | *Parts* | *Parts* |
| (structure with OH, NH-tolyl-SO₃H) | 5 | 10 |
| (structure with NHCH₃, NH-tolyl-SO₃H) | 12 | 33 |
| (structure with NH₂, Br, NH-tolyl-SO₃H) | 4 | 20 |
| (structure with N-CH₃ ring, NH-tolyl-SO₃H) | 50 | 100 |
| (structure with NH-xylyl-SO₃H, dimethyl) | 25 | 40 |

What we claim is:

1. The lithium salts of acid wool dyestuffs of the general formula:

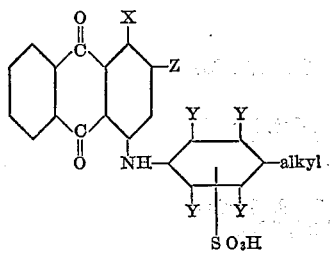

wherein X stands for a member of the group consisting of hydroxy, amino, alkylamino, sulphonated arylamino, Z stands for a member of the group consisting of hydrogen and halogen, and Y stands for a member of the group consisting of hydrogen and alkyl.

2. The lithium salt of the dyestuff of the formula:

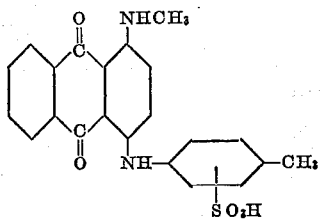

3. The lithium salt of the dyestuff of the formula:

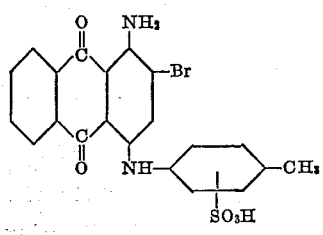

4. The lithium salt of the dyestuff of the formula:

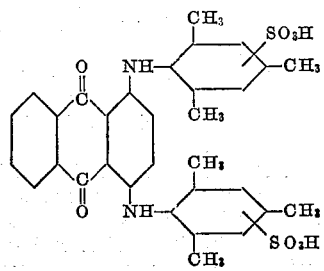

SAMUEL von ALLMEN.
EDMOND ROSSELET.